United States Patent
Ogawa

(10) Patent No.: US 7,274,119 B2
(45) Date of Patent: Sep. 25, 2007

(54) YOKE FOR VOICE COIL MOTOR IN RECORDING DISK DRIVE

(75) Inventor: Yoshinori Ogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/172,865

(22) Filed: Jul. 5, 2005

(65) Prior Publication Data
US 2006/0202565 A1 Sep. 14, 2006

(30) Foreign Application Priority Data
Mar. 14, 2005 (JP) ............... 2005-071901

(51) Int. Cl.
*H02K 41/00* (2006.01)
*G11B 21/08* (2006.01)

(52) U.S. Cl. ..................... 310/12; 360/264.8
(58) Field of Classification Search ............... 310/12, 310/13, 14; 360/266.7, 264.7, 266.4, 294.5
See application file for complete search history.

(56) References Cited

U.S. PATENT DOCUMENTS

| | | | | |
|---|---|---|---|---|
| 2,286,386 A | * | 6/1942 | Silverman | ............. 367/184 |
| 4,658,313 A | * | 4/1987 | Takahashi et al. | ....... 360/78.12 |
| 4,707,754 A | * | 11/1987 | Patel et al. | ........... 360/264.8 |
| 5,109,310 A | * | 4/1992 | Ohkjita et al. | .......... 360/264.3 |
| 5,138,605 A | * | 8/1992 | Shtipelman et al. | ....... 720/666 |
| 5,363,260 A | * | 11/1994 | Kawakami | ........... 360/97.01 |
| 5,818,666 A | * | 10/1998 | Chaya | ................ 360/266.8 |
| 6,912,105 B1 | * | 6/2005 | Morita et al. | ........... 360/97.01 |
| 2004/0105190 A1 | * | 6/2004 | Kim et al. | .............. 360/264.7 |
| 2005/0174698 A1 | * | 8/2005 | Matsuda et al. | ........ 360/264.7 |

FOREIGN PATENT DOCUMENTS

| | | |
|---|---|---|
| JP | 11-185412 | 7/1999 |
| JP | 2004-95177 | 3/2004 |
| WO | WO 2004093077 A1 * | 10/2004 |

\* cited by examiner

*Primary Examiner*—Burton Mullins
*Assistant Examiner*—Erik Preston
(74) *Attorney, Agent, or Firm*—Kratz, Quintos & Hanson, LLP

(57) ABSTRACT

A first yoke member is received on a first reference plane defined on a support body. A second yoke member is coupled to the first yoke member so as to define a space for accommodation of a voice coil between the first and second yoke members. The second yoke member is opposed to a second reference plane, different from the first reference plane, defined on the support body. A screw member is engaged with the second yoke member for movement in the direction intersecting the second reference plane. The second yoke member is received on the second reference plane of the support body based on the movement of the screw member. Even if a gap happens to exist between the second yoke member and the second reference plane due to dimensional errors, the second yoke member is reliably supported on the support body.

5 Claims, 4 Drawing Sheets

# YOKE FOR VOICE COIL MOTOR IN RECORDING DISK DRIVE

BACKGROUND OF THE INVENTION

1. Field of the Invention

The present invention relates to a yoke for a voice coil motor, VCM, incorporated within a recording disk drive such as a hard disk drive, HDD, for example.

2. Description of the Prior Art

A head actuator is incorporated within a hard disk drive. A voice coil motor of the head actuator includes a magnetic yoke. The yoke includes an upper yoke member and a lower yoke member coupled to each other. The lower yoke member is received on a first reference plane defined on a base of an enclosure. The upper yoke member is received on a second reference plane defined on bosses standing from the base. Screws are employed to couple the upper yoke member to the second reference plane. A voice coil is located in a space between the upper and lower yoke members. The voice coil is fixed to an actuator block capable of rotating around a support shaft.

Magnetic flux circulates through the upper and lower yoke members. The magnetic flux is generated in the voice coil in response to the supply of electric current. The interaction between the magnetic flux of the voice coil and the magnetic flux of the yokes causes the movement of the voice coil. The actuator block is thus allowed to rotate around the support shaft.

The alignment of the lower yoke member with the first reference plane in the aforementioned manner often hinders the contact of the upper yoke member against the second reference plane due to dimensional errors or the like, for example. The upper yoke member cannot be supported on the bosses. In this case, if the voice coil moves faster, the reaction of the yoke induces vibration of the yoke. The vibration deteriorates the accuracy in positioning a head slider coupled to the actuator block, for example. The vibration also causes the lower yoke member to contact the base. The contact makes noise.

SUMMARY OF THE INVENTION

It is accordingly an object of the present invention to provide a voice coil motor capable of avoiding generation of vibration and noise. It is an object of the present invention to provide a recoding disk drive capable of avoiding generation of vibration and noise in the voice coil motor.

According to a first aspect of the present invention, there is provided a yoke for a voice coil motor, comprising: a first yoke member received on a first reference plane defined on a support body, said first yoke member coupled to the first reference plane; a second yoke member coupled to the first yoke member so as to define a space for accommodation of a voice coil between the first and second yoke members, said second yoke member opposed to a second reference plane, different from the first reference plane, defined on the support body; and a screw member engaged with the second yoke member for movement in a direction intersecting the second reference plane.

When the yoke is to be fixed to the support body, the first yoke member is received on the first reference plane of the support member. The first yoke member is reliably supported on the support body. The second yoke member is simultaneously received on the second reference plane of the support body based on the movement of the screw member. Even if a gap happens to exist between the second yoke member and the second reference plane due to dimensional errors or the like, the second yoke member is reliably supported on the support body. Even when any force is applied to the first and second yoke members, generation of vibration and noise can be avoided in the first and second yoke members.

The screw member may be made of a magnetic material having a high permeability. The screw member made of the magnetic material is allowed to serve as a part of the second yoke member. The second yoke member is prevented from a reduced volume of the magnetic material irrespective of the occupation of the screw member in the second yoke member. The circulation of magnetic flux can thus sufficiently be established in the second yoke member.

The screw member may be received in a receiving bore defined in the second yoke member. This structure serves to avoid an increased thickness of the yoke. Assembling of the yoke into a recording disk drive such as a hard disk drive cannot require additional occupation of spaces within the recording disk drive, for example.

According to a second aspect of the present invention, there is provided a recording disk drive comprising: a support body defining a first reference plane and a second reference plane different from the first reference plane; a first yoke member received on the first reference plane, said first yoke member coupled to the first reference plane; a second yoke member coupled to the first yoke member, said second yoke member opposed to the second reference plane; a screw member engaged with the second yoke member for movement in a direction intersecting the second reference plane; and a coil opposed to at least one of the first and second yoke members.

When the yoke is to be fixed within the recording disk drive, the first yoke member is received on the first reference plane of the support member. The first yoke member is reliably supported on the support body. The second yoke member is simultaneously received on the second reference plane of the support body based on the movement of the screw member. Even if the reaction is induced in the first or second yoke member due to the movement of the coil, generation of vibration and noise can be avoided in the first and second yoke members.

The recording disk drive may further comprise a through hole penetrating through the support body at a position opposed to the screw member, said through hole has a diameter smaller than that of a screw head of the screw member. A screwdriver can be inserted into the through hole for driving the screw member. The screwdriver can be employed to move the screw member in the direction intersecting the second reference plane even after the first and second yoke members are assembled into the recording disk drive. The position of the screw member is in this manner adjusted relative to the second reference plane. Since the inside diameter of the through hole is set smaller than the diameter of the screw head of the screw member, the screw member is reliably prevented from dropping from the support body. The screw member is reliably received on the second reference plane.

The screw member may be made of a magnetic material having a higher permeability. The screw member made of the magnetic material is allowed to serve as a part of the second yoke member. The second yoke member is prevented from a reduced volume of the magnetic material irrespective of the occupation of the screw member in the second yoke member. The circulation of magnetic flux can thus sufficiently be established in the second yoke member.

The screw member may be received in a receiving bore defined in the second yoke member. This structure serves to avoid an increased thickness of the yoke. Assembling of the yoke into the recording disk drive cannot require additional occupation of spaces within the recording disk drive, for example.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
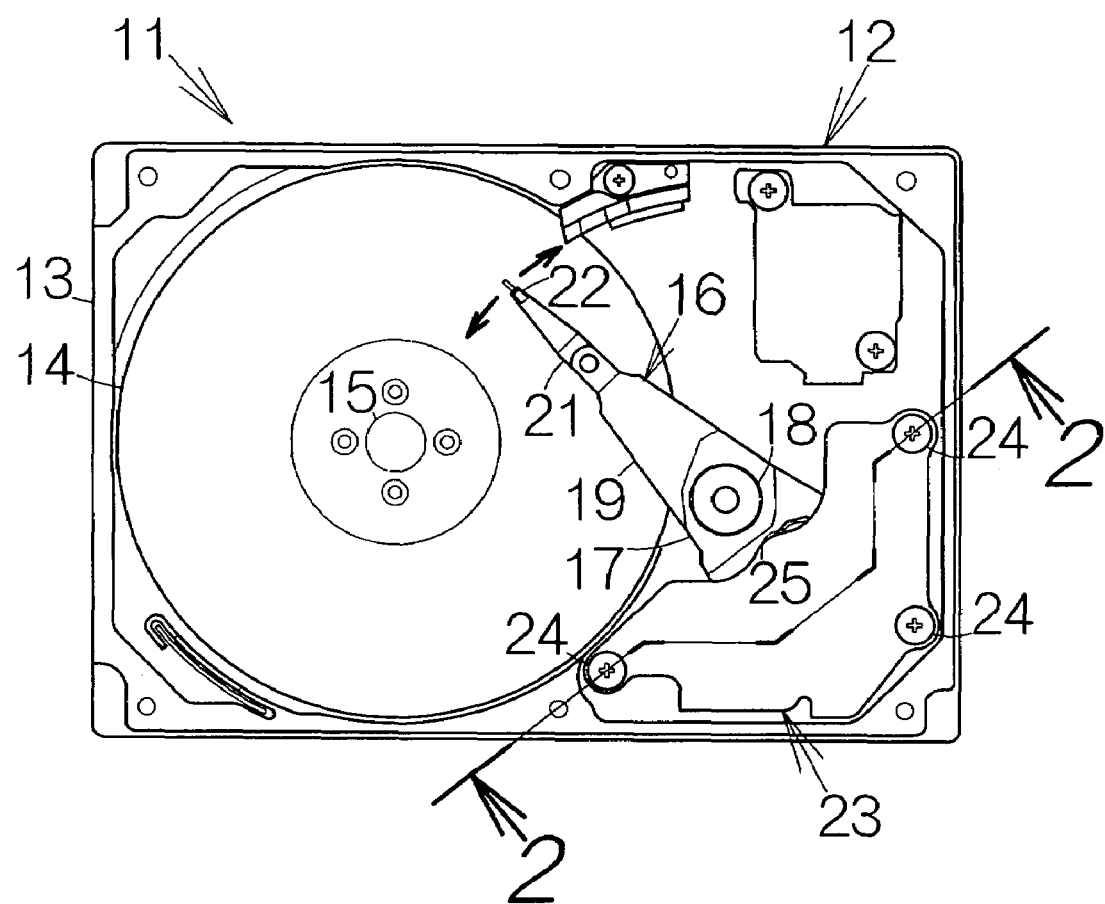
FIG. 1 is a perspective view schematically illustrating the outline of a hard disk drive (HDD) as a specific example of a recording disk drive according to an embodiment of the present invention.

FIG. 1 schematically illustrates a hard disk drive, HDD, 11 as a specific example of a recording disk drive according to an embodiment of the present invention. The hard disk drive 11 includes a box-shaped enclosure 12. The enclosure 12 includes a box-shaped support body or base 13 defining an inner space of a flat parallelepiped, for example. The base 13 may be made of a metallic material such as aluminum, for example. Molding process may be employed to form the base 13. A cover, not shown, is coupled to the base 13. The cover serves to close the inner space within the base 13 and the cover. Pressing process may be employed to form the cover out of a plate, for example. The plate may be a layered material, for example.

At least one magnetic recording disk 14 as a recording disk is incorporated within the inner space of the base 13. The magnetic recording disk or disks 14 is mounted on the driving shaft of a spindle motor 15. The spindle motor 15 drives the magnetic recording disk or disks 14 at a higher revolution speed such as 5,400 rpm, 7,200 rpm, 10,000 rpm, 15,000 rpm, or the like.

A head actuator 16 is also incorporated within the inner space of the base 13. The head actuator 16 includes an actuator block 17. The actuator block 17 is supported on a vertical support shaft 18 for relative rotation. Actuator arms 19 are defined in the actuator block 17. The actuator arms 19 are designed to extend in a horizontal direction from the vertical support shaft 18. The actuator block 17 may be made of aluminum, for example. Extrusion molding process may be employed to form the actuator block 17.

Elastic head suspensions 21 are fixed to the tip ends of the actuator arms 19. The head suspension 21 is designed to extend forward from the corresponding tip end of the individual actuator arm 19. A gimbal spring, not shown, is connected to the tip end of the individual head suspension 21. A flying head slider 22 is fixed on the surface of the gimbal spring. The gimbal spring allows the flying head slider 22 to change its attitude relative to the head suspension 21.

An electromagnetic transducer, not shown, is mounted on the flying head slider 22. The electromagnetic transducer may include a write element and a read element. The write element may include a thin film magnetic head designed to write magnetic bit data into the magnetic recording disk 14 by utilizing a magnetic field induced at a thin film coil pattern. The read element may include a giant magnetoresistive (GMR) element or a tunnel-junction magnetoresistive (TMR) element designed to discriminate magnetic bit data on the magnetic recording disk 14 by utilizing variation in the electric resistance of a spin valve film or a tunnel-junction film, for example.

When the magnetic recording disk 14 rotates, the flying head slider 22 is allowed to receive airflow generated along the rotating magnetic recording disk 14. The airflow serves to generate positive pressure or a lift as well as negative pressure on the flying head slider 22. The flying head slider 22 is thus allowed to keep flying above the surface of the magnetic recording disk 14 during the rotation of the magnetic recording disk 14 at a higher stability established by the balance between the urging force of the head suspension 21 and a combination of the lift and the negative pressure.

When the actuator arm 19 is driven to swing about the support shaft 18 during the flight of the flying head slider 22, the flying head slider 22 is allowed to move along the radial line of the magnetic recording disk 14. The electromagnetic transducer on the flying head slider 22 is thus allowed to cross the data zone defined between the innermost and outermost recording tracks. The electromagnetic transducer can thus be positioned right above a target recording track on the magnetic recording disk 14.

A voice coil motor, VCM, 23 is connected to the tail of the actuator block 17. The voice coil motor 23 is fixed on the base 13 based on three screws 24, for example. A voice coil 25 is coupled to the actuator block 17. The voice coil 25 is designed to extend in a horizontal direction from the vertical support shaft 18. The voice coil motor 23 allows the voice coil 25 to get opposed to permanent magnets, as described later in detail. When magnetic field is generated in the voice coil 25 in response to the supply of electric current, the actuator block 17 is allowed to rotate.

Figure 2:
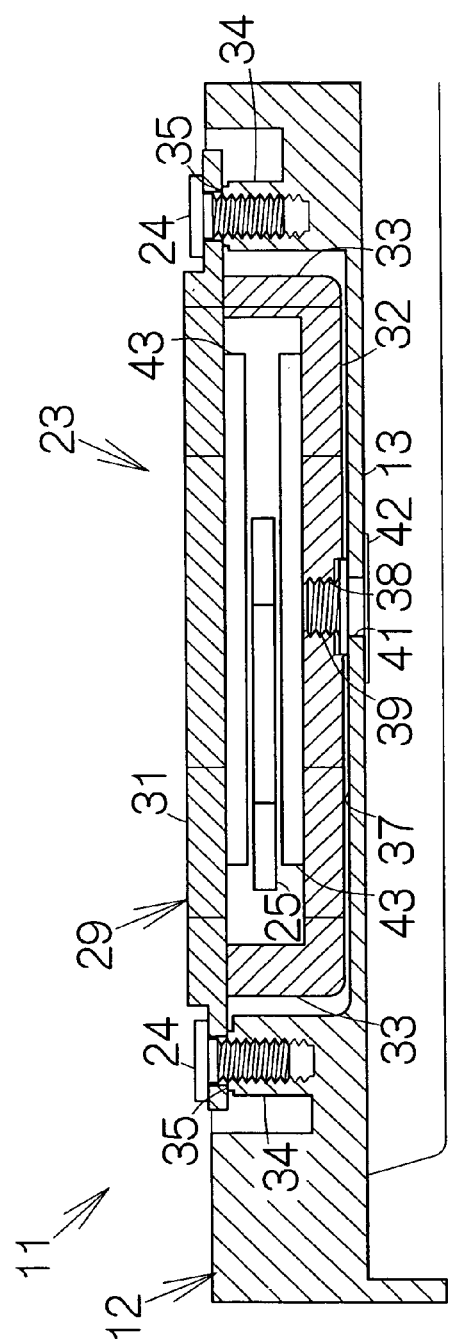
FIG. 2 is a sectional view taken along the line 2-2 in FIG. 1.

As shown in FIG. 2, the voice coil motor 23 includes a yoke 29. The yoke 29 comprises first and second yoke members coupled to each other. An upper yoke 31 is provided within the first yoke member. A lower yoke 32 is likewise provided within the second yoke member. The inward surface of the upper yoke 31 is opposed to the inward surface of the lower yoke 32. A pair of side yoke 33, 33 is formed in the second yoke member to stand upright from the lower yoke 32. The upper ends of the side yokes 33 receive the upper yoke 31. The upper yoke 31, the lower yoke 32, and the side yokes 33 are made of a magnetic material such as iron, or the like.

Bosses 34 are defined in the base 13 so as to stand upright from the surface of the bottom plate. The bosses 34 are integral to the base 13. A first reference plane 35 is defined within a horizontal plane including the top surfaces of the bosses 34. The inward surface of the upper yoke 31 is received on the first reference plane 35. The screws 24 are screwed into the corresponding bosses 34. The upper yoke 31 is in this manner coupled to the first reference plane 35. The upper yoke 31 is thus fixed to the base 13.

The outward surface of the lower yoke 32 is opposed to a second reference plane 37, different from the first reference plane 35, defined on the surface of the bottom plate of the base 13. Here, a space is defined between the outward surface of the lower yoke 32 and the second reference plane 37. The first reference plane 35 is located closer to the cover in the direction parallel to the support shaft 18 than the second reference plane 37 is. The second reference plane 37 may extend in parallel with the first reference plane 35.

A receiving bore or tapped bore 38 is defined in the lower yoke 32 to extend from the outward surface of the lower yoke 32. The females crew is established in the tapped bore 38. Here, the tapped bore 38 may penetrate through the lower yoke 32, for example. The tapped bore 38 is designed to completely receive a screw member 39. When the screw member 39 is driven around the longitudinal axis in the tapped bore 38, the screw member 39 is allowed to move in the direction perpendicular to the second reference plane 37, for example.

As described above, a space is defined between the outward surface of the lower yoke 32 and the surface of the bottom plate of the base 13. The position of the screw member 39 can be adjusted relative to the second reference plane 37 in the direction perpendicular to the second reference plane 37. The screw head of the screw member 39 can in this manner be received on the surface of the bottom plate of the base 13 based on the movement of the screw member 39. The lower yoke 32 can thus be supported on the bottom plate of the base 13 based on the screw member 39. The screw member 39 may be made of a magnetic material having a higher permeability, for example.

A through hole 41 is formed in the bottom plate of the base 13. The through hole 41 is designed to penetrate through the base plate. The through hole 41 is located at a position opposed to the screw member 39. The through hole 41 is aligned with the tapped bore 38 in a coaxial relation. The diameter of the through hole 41 is set smaller than the diameter of the screw head of the screw member 39. A screwdriver can be received into the through hole 41 for driving the screw member 39 as described later in detail. A seal member 42 is attached to the base 13 for tightly closing the opening of the through hole 41.

The upper and lower yokes 31, 32 cooperate to define an inner space. A pair of permanent magnet 43, 43 is disposed within the inner space. One of the permanent magnets 43, 43 is fixed to the inward surface of the upper yoke 31. The other of the permanent magnets 43, 43 is fixed to the inward surface of the lower yoke 32. The permanent magnets 43 generate magnetic flux. The generated magnetic flux circulates through the upper yoke 31, the lower yoke 32, and the side yokes 33.

The aforementioned voice coil 25 is disposed in a space between the permanent magnets 43 within the inner space. The voice coil 25 is opposed to the permanent magnets 43 of the upper and lower yokes 31, 32. Gaps are defined between the voice coil 25 and the permanent magnets 43. Electric wires, not shown, are connected to the voice coil 25. Electric current is supplied to the voice coil 25 through the electric wires. The supplied electric current serves to generate magnetic flux at the voice coil 25.

Now, assume that electric current is supplied to the voice coil 25. As described above, magnetic flux is generated at the voice coil 25 in response to the supply of the electric current. Magnetic flux is also generated at the permanent magnets 43. The interaction between the generated magnetic flux and the magnetic flux of the permanent magnets 43 causes the movement of the voice coil 25 within the inner space. The voice coil 25 thus swings around the support shaft 18. This movement of the voice coil 25 causes the swinging movement of the actuator arms 19.

The hard disk drive 11 allows the inward surface of the upper yoke 31 to be received on the first reference plane 35 when the yoke 29 is fixed to the base 13. The upper yoke 31 is reliably supported on the base 13. The lower yoke 32 is received on the second reference plane 37 through the screw member 39. Even if a gap happens to exist between the outward surface of the lower yoke 32 and the second reference plane 37 due to dimensional errors or the like, the lower yoke 32 is reliably supported on the base 13. Even if the reaction is applied to the lower yoke 32 in response to the movement of the voice coil 25, generation of vibration and noise can be avoided in the yoke 29. The sufficient rigidity of the yoke 29 in this manner serves to avoid a deteriorated accuracy in positioning the flying head slider 22.

Moreover, the screw member 39 is received in the tapped bore 38 defined in the lower yoke 32. Even when the thickness of the HDD 11 is reduced, additional occupation of space cannot be required for the screw member 39 within the inner space. In addition, since the screw member 39 is made of a magnetic material having a higher permeability, the screw member 39 also serves as apart of the lower yoke 32. The lower yoke 32 is thus prevented from a reduced volume of the magnetic material. The circulation of magnetic flux can sufficiently be maintained in the lower yoke 32.

Figure 3:
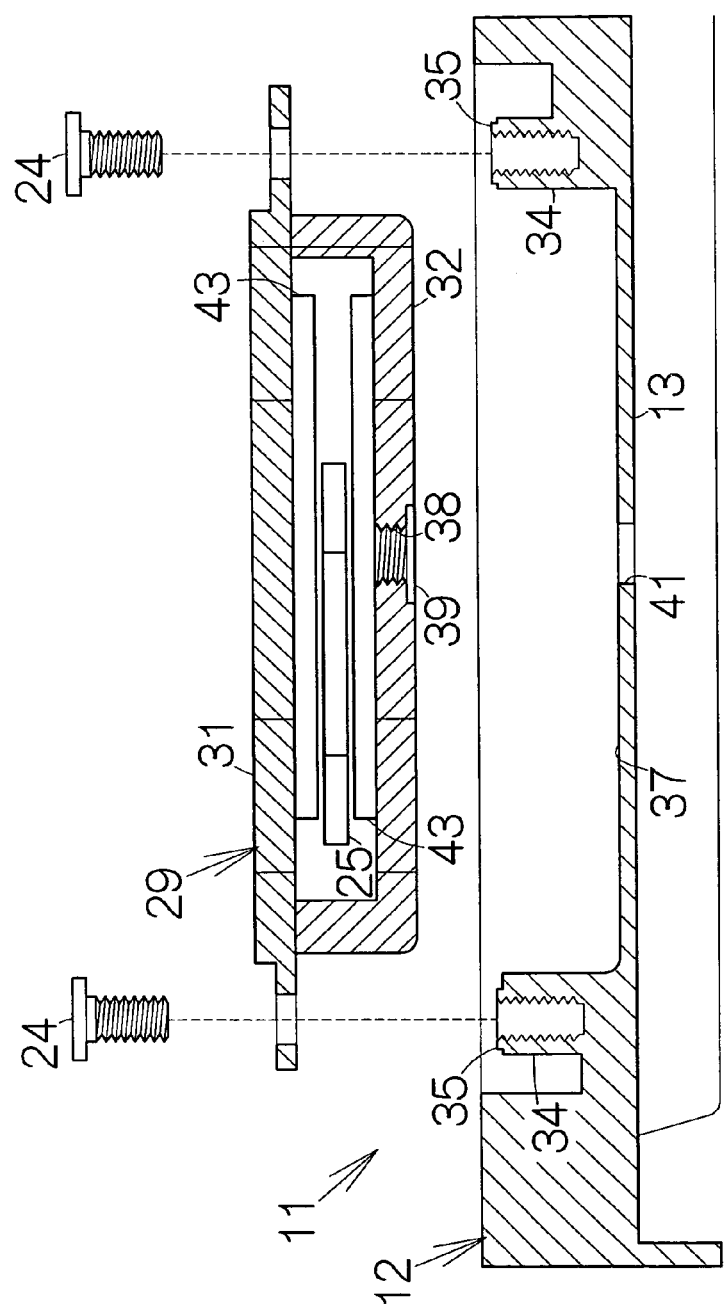
FIG. 3 is a sectional view, corresponding to FIG. 2, schematically illustrating the process of fixing the yoke to the base of the hard disk drive.

As shown in FIG. 3, the base 13 and the yoke 29 are first prepared in the production of the hard disk drive 11, for example. The screw member 39 is screwed into the tapped bore 38 defined in the lower yoke 32. The screw member 39 is thoroughly received in the tapped bore 38. The lower yoke 32 is then allowed to oppose the outward surface to the second reference plane 37, while the upper yoke 31 is simultaneously allowed to oppose the inward surface to the first reference plane 35. The screw member 39 is in this manner opposed to the through hole 41 defined in the base 13. The screws 24 are thereafter screwed into the corresponding bosses 34. The upper yoke 31 is in this manner coupled to the first reference plane 37. The upper yoke 31 is fixed on the base 13.

Figure 4:
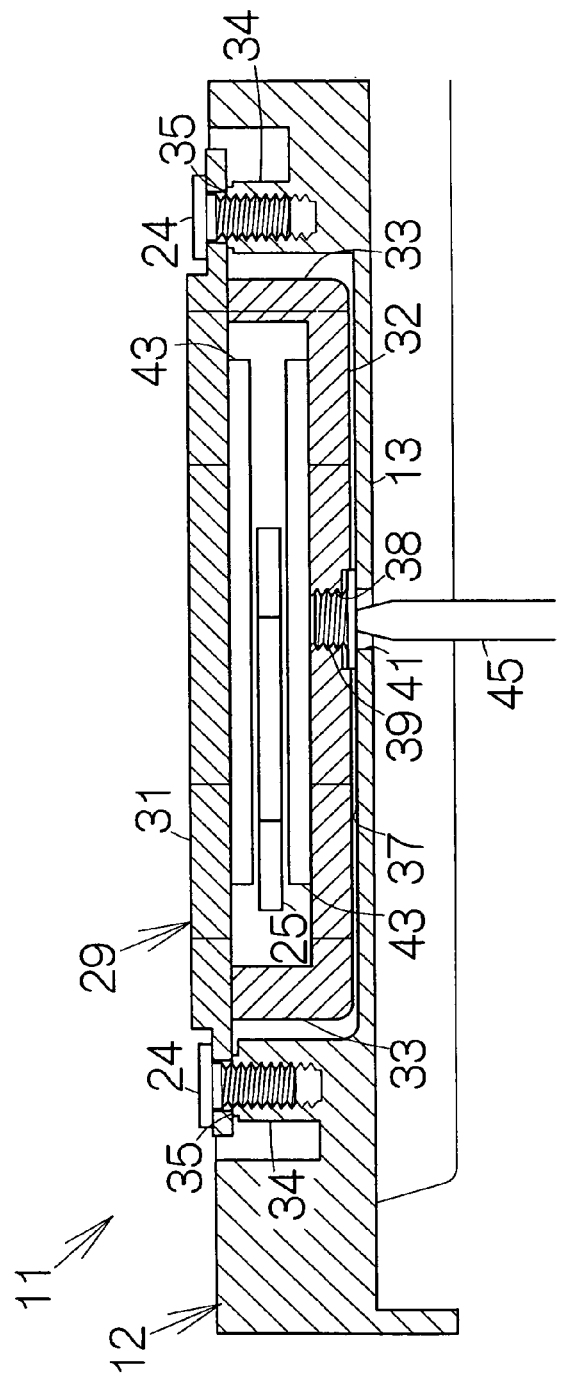
FIG. 4 is a sectional view, corresponding to FIG. 2, schematically illustrating the process of contacting the yoke against the base.

As shown in FIG. 4, the tip end of a screwdriver 45 is then inserted into the through hole 41. The screwdriver 45 can be employed to loose the screw member 39. The screw member 39 thus moves toward the second reference plane 37 from the lower yoke 32. Since the outer diameter of the screw head of the screw member 39 is set larger than the inside diameter of the through hole 41, the screw head of the screw member 39 is received on the second reference plane 37. The lower yoke 32 is supported on the base 13 through the screw member 39 in this manner. The seal member 42 is thereafter employed to close the opening of the through hole 41. The yoke 29 is in this manner fixed on the base 13.

What is claimed is:

1. A yoke for a voice coil motor, comprising:
a first yoke member received on a first reference plane defined on a support body, said first yoke member coupled to the first reference plane;
a second yoke member coupled to the first yoke member so as to define a space for accommodation of a voice coil between the first and second yoke members, said second yoke member being spaced apart from a second reference plane, different from the first reference plane, defined on the support body; and
a screw member screwed in the second yoke member for movement in a direction intersecting the second reference plane, the screw member having a screw head arranged to contact the second reference plane of the support body,
wherein said screw head of the screw member is received in a receiving bore defined in the second yoke member.

2. The yoke according to claim 1, wherein said screw member is made of a magnetic material having a high permeability.

3. A recording disk drive comprising:

a support body defining a first reference plane and a second reference plane different from the first reference plane;

a first yoke member received on the first reference plane, said first yoke member coupled to the first reference plane;

a second yoke member coupled to the first yoke member, said second yoke member being spaced apart from the second reference plane;

a screw member screwed in the second yoke member for movement in a direction intersecting the second reference plane, the screw member having a screw head arranged to contact the second reference plane of the support body; and a coil opposed to at least one of the first and second yoke members, wherein said screw head of the screw member is received in a receiving bore defined in the second yoke member.

4. The recording disk drive according to claim 3, further comprising a through hole penetrating through the support body at a position opposed to the screw head of the screw member, said through hole has a diameter smaller than that of the screw head of the screw member.

5. The recording disk drive according to claim 3, wherein said screw member is made of a magnetic material having a high permeability.

* * * * *